(12) United States Patent
Constantin et al.

(10) Patent No.: US 8,608,010 B2
(45) Date of Patent: Dec. 17, 2013

(54) SEALING ELEMENT FASTENING SYSTEM FOR A PRESSURE VESSEL, IN PARTICULAR A REACTOR PRESSURE VESSEL

(75) Inventors: Daniel Constantin, Wilhermsdorf (DE); Jens Beck, Veitsbronn (DE); Reiner Scheler, Forchheim (DE)

(73) Assignee: Areva GmbH, Erlangen (DE)

( * ) Notice: Subject to any disclaimer, the term of this patent is extended or adjusted under 35 U.S.C. 154(b) by 170 days.

(21) Appl. No.: 13/165,175

(22) Filed: Jun. 21, 2011

(65) Prior Publication Data

US 2011/0309077 A1 Dec. 22, 2011

(30) Foreign Application Priority Data

Jun. 21, 2010 (DE) .......................... 10 2010 024 501

(51) Int. Cl.
*F16J 13/00* (2006.01)
*G21C 13/028* (2006.01)

(52) U.S. Cl.
USPC ........... 220/378; 220/240; 220/327; 220/328; 220/233; 376/205; 376/294; 376/203; 376/260; 376/263

(58) Field of Classification Search
USPC ............. 411/356; 81/436; 269/1, 2; 220/240, 220/327, 328, 378, 319; 250/506.1; 376/205, 296, 203, 260
See application file for complete search history.

(56) References Cited

U.S. PATENT DOCUMENTS

| | | | | |
|---|---|---|---|---|
| 2,797,017 A | * | 6/1957 | Tangard | 220/328 |
| 3,007,600 A | * | 11/1961 | Horner | 220/240 |
| 3,079,033 A | * | 2/1963 | Wootton | 220/582 |
| 3,095,110 A | * | 6/1963 | Pierce, Jr. | 220/327 |
| 3,119,117 A | * | 1/1964 | Grubman | 2/102 |
| 3,221,925 A | * | 12/1965 | Brister et al. | 220/640 |
| 3,276,619 A | * | 10/1966 | Scholz | 220/378 |
| 3,291,509 A | * | 12/1966 | Borsum et al. | 285/187 |
| 3,298,794 A | | 1/1967 | Mikesell, Jr. et al. | |
| 3,464,581 A | * | 9/1969 | Polcer | 220/582 |
| 3,599,825 A | * | 8/1971 | Jorgensen | 220/327 |
| 3,650,657 A | | 3/1972 | Witkin | |
| 3,669,303 A | * | 6/1972 | Launay | 220/378 |
| 3,685,123 A | * | 8/1972 | Frisch | 29/239 |
| 3,867,254 A | | 2/1975 | Brandstetter | |
| 4,239,124 A | * | 12/1980 | Inouye | 220/240 |
| 4,247,015 A | * | 1/1981 | Straub | 220/328 |
| 4,443,016 A | * | 4/1984 | Schungel | 277/434 |
| 4,489,850 A | * | 12/1984 | Reneau | 220/323 |

(Continued)

FOREIGN PATENT DOCUMENTS

DE 2 134 737 2/1972
KR 2003-0002081 A 1/2003

*Primary Examiner* — Mickey Yu
*Assistant Examiner* — Gideon Weinerth
(74) *Attorney, Agent, or Firm* — Laurence A. Greenberg; Werner H. Stemer; Ralph E. Locher (57) ABSTRACT

The invention relates to a sealing element fastening system for at least one sealing element of a pressure vessel, which has at least one opening and a sealing part, in particular a cover, provided for the opening. In the operating state of the pressure vessel each sealing element is at least partially inserted in an accommodating groove in the sealing part and corresponding sealing element fastening devices are positioned in each case in an indentation in the sealing part. The indentations are in each case sealed by a fill element in the operating state of the pressure vessel.

12 Claims, 8 Drawing Sheets

(56) References Cited

U.S. PATENT DOCUMENTS

| | | | | |
|---|---|---|---|---|
| 4,636,645 A | * | 1/1987 | Kessinger | 250/506.1 |
| 4,716,005 A | * | 12/1987 | Ezekoye et al. | 376/205 |
| 4,742,702 A | * | 5/1988 | Swertz | 70/231 |
| 4,818,476 A | * | 4/1989 | Gasparro | 376/294 |
| 4,874,573 A | * | 10/1989 | Wood et al. | 376/272 |
| 4,893,022 A | * | 1/1990 | Hall et al. | 250/506.1 |
| 4,908,179 A | * | 3/1990 | Brookins | 376/203 |
| 4,980,117 A | * | 12/1990 | Blaushild | 376/205 |
| 5,309,626 A | * | 5/1994 | Tolino | 29/723 |
| 5,434,894 A | * | 7/1995 | Chiang et al. | 376/203 |
| 5,967,708 A | * | 10/1999 | Adams et al. | 408/115 R |
| 6,206,227 B1 | * | 3/2001 | Ferri, Jr. | 220/581 |
| 6,301,319 B1 | * | 10/2001 | Merkovsky et al. | 376/205 |
| 6,317,477 B1 | * | 11/2001 | Matteson | 376/203 |
| 6,823,034 B1 | * | 11/2004 | Doman | 376/272 |

* cited by examiner

SEALING ELEMENT FASTENING SYSTEM FOR A PRESSURE VESSEL, IN PARTICULAR A REACTOR PRESSURE VESSEL

CROSS-REFERENCE TO RELATED APPLICATION

This application claims the priority, under 35 U.S.C. §119, of German application DE 10 2010 024 501.1-12, filed Jun. 21, 2010; the prior application is herewith incorporated by reference in its entirety.

BACKGROUND OF THE INVENTION

Field of the Invention

The invention relates to a system for the fastening of sealing elements for a pressure vessel, which has at least one opening and a sealing part provided for the opening. In this case, this can be both a mobile pressure vessel, for example a transport container or a hydraulic reservoir, and a stationary pressure vessel, for example a process control pressure vessel or a reactor pressure vessel. In the case of such pressure vessels, in each case at least one sealing element is introduced in the operating state between the contact surfaces of the pressure vessel in the region of the respective opening and the contact surfaces of the corresponding sealing parts. In some cases, the sealing elements are fastened with the aid of a sealing element fastening system either to the pressure vessel or to the sealing part in order to simplify, among other things, the opening and sealing of the pressure vessel.

Published, Korean patent application No. 1020010038819 A makes known a sealing element fastening system, by way of which O-ring seals are fastened to a pressure vessel sealing part in the operating state of the pressure vessel. To this end, the O-ring seals are inserted at least partially in an accommodating groove in the pressure vessel sealing part. Cap screws, which are screw-connected to the pressure vessel sealing part, are arranged in a countersunk manner in a plurality of indentations that connect directly in each case to the accommodating groove. The cap screws fix, in each case, a holding element that is shaped in the manner of an angle bracket, the portion of which remote from the respective cap screw abutting against the corresponding O-ring seal in such a manner that, on the one hand, the O-ring seal is held in the accommodating groove and, on the other hand, the holding element is positioned in a countersunk manner in the pressure vessel sealing part.

In the case of the sealing element fastening system, in each case a free space remains in the region of the respective indentation and the accommodating groove adjacent thereto. These free spaces result in free contact surfaces at the corresponding O-ring seals. In the operating state of the pressure vessel, a substance kept in the pressure vessel spreads out into those free spaces as far as the contact surfaces. The contact between the substance and the O-ring seal can then lead to unwanted reaction processes, where the O-ring seal is damaged and the substance contaminated.

SUMMARY OF THE INVENTION

It is accordingly an object of the invention to provide a sealing element fastening system for a pressure vessel which overcomes the above-mentioned disadvantages of the prior art devices of this general type, in which the spreading out of the substance into the free spaces is prevented.

With the foregoing and other objects in view there is provided, in accordance with the invention a sealing element fastening system for sealing elements of a pressure vessel. The sealing element fastening system contains a sealing part having an accommodating groove and an indentation. The sealing part is provided for covering an opening of the pressure vessel. In an operating state of the pressure vessel each sealing element is at least partially inserted in the accommodating groove in the sealing part. Corresponding sealing element fastening devices are disposed in each case in one of the indentations in the sealing part. Filling elements are provided, the indentations in each case sealed by one of the fill elements in the operating state of the pressure vessel.

A sealing element fastening system is provided for at least one sealing element of a pressure vessel, which has at least one opening and a complementary sealing part. Corresponding to the teaching of the invention, in the operating state of the pressure vessel, each sealing element is inserted at least partially in an accommodating groove in the sealing part and corresponding sealing element fastening devices are positioned, in each case, in an indentation, sealed by a fill element, in the sealing part. Through the sealing of the indentations, the spreading of the substance into the free spaces, and as a consequence the interaction between sealing elements and the substance kept in the pressure vessel, is prohibited as extensively as possible. Although in particular in the case of process control pressure vessels, high priority is given to the avoiding of contamination of the substances kept in the pressure vessel, in the case of this invention, proceeding from the fact that the substances can also be hazardous substances, the most important objective is deemed, above all, to be the protection of the sealing elements and consequently the assurance of the tightness of the pressure vessel.

According to a preferred embodiment, each sealing element fastening device includes a ring-shaped holding element with an integrally molded holding arm, which is fixed to the sealing part in the operating state of the pressure vessel. A screw, for example, can be provided for the fixing process. A fastening variant that is technically very simple is realized in this manner.

In this conjunction, it is deemed to be advantageous when, in the operating state of the pressure vessel, each holding arm engages into a recess on the respective sealing element and consequently holds the sealing element on the sealing part. In this case, the engagement of each holding arm in a corresponding recess can be realized in both a detachable and non-detachable manner. Detachable versions, such as, for example, plug-in connections, are to be preferred in particular when simple exchangeability of the sealing elements is desired.

A particularly expedient variant of the sealing element fastening system is characterized in that threaded bolts with two separate threaded portions are used. Whereas the first threaded portion of each threaded bolt passes through a holding element in the operating state of the pressure vessel and is screw-connected into a complementary counter thread in the sealing part, the second threaded portion of each threaded bolt passes through a fill element together with a bolt nut, which serves for fastening the fill element to each second threaded portion. In this case this is a variant with an upgrade character and is conceived, in particular, for already available sealing element fastening systems without a fill element, where the sealing elements are fixed by cap screws.

In an advantageous further development of this variant, a ring-shaped projection is integrally molded in each case between the two threaded portions, as a stop member for the fill element, on the one hand, and for the holding element, on the other. This means that it is possible to perform the fastening of the respective holding element to the sealing part and the fixing of the respective fill element to the threaded bolt by two operating steps that are separate from each other. Such a separation of this type can be helpful, for example, when one individual fill element has to be exchanged on account of damage.

In this context, an embodiment with a number of recesses on each ring-shaped projection as a point of application for a tool is preferred. The tool provided for this is, on the one hand, to simplify the handling of the threaded bolts and, on the other hand, to open up the possibility of predetermining an exact torque at which the threaded bolts are screw-connected into the respective counter thread in the sealing part.

Over and above this, it is particularly advantageous to provide recesses also on each bolt nut, the recesses matching those on the ring-shaped projection in form and relative position to each other. This means that the complete assembly of each unit of the sealing element fastening system is able to be performed with the aid of only one tool. The corresponding tool is preferably provided with a variable torque preset. Different torque values can be predetermined in this way for the tightening of each bolt nut when fastening the corresponding fill element and for the screw-connecting of each threaded bolt into the respective counter thread.

In an alternative variant with an upgrade character, a clamping bush is provided for each unit of the sealing element fastening system, the clamping bush in each case fastening a holding element in a rotatable manner on the corresponding fill element. During the pre-assembly of the respective unit, the clamping bush, passing through the holding element, is pressed for this purpose into a central opening in the fill element. Finally, in the operating state of the pressure vessel, each system module of the sealing element fastening devices is preassembled in such a manner and is preferably fixed on the sealing part by way of a cap screw that passes through the fill element, the holding element and the clamping bush. The rotatability of the holding elements, implemented in this manner, in relation to the fill elements allows, for example, greater tolerance ranges when aligning the sealing elements in the assembly process of the sealing element fastening system.

Other features which are considered as characteristic for the invention are set forth in the appended claims.

Although the invention is illustrated and described herein as embodied in a sealing element fastening system for a pressure vessel, in particular a reactor pressure vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In all the figures parts that correspond to each other are provided with the identical references.

Figure 1:
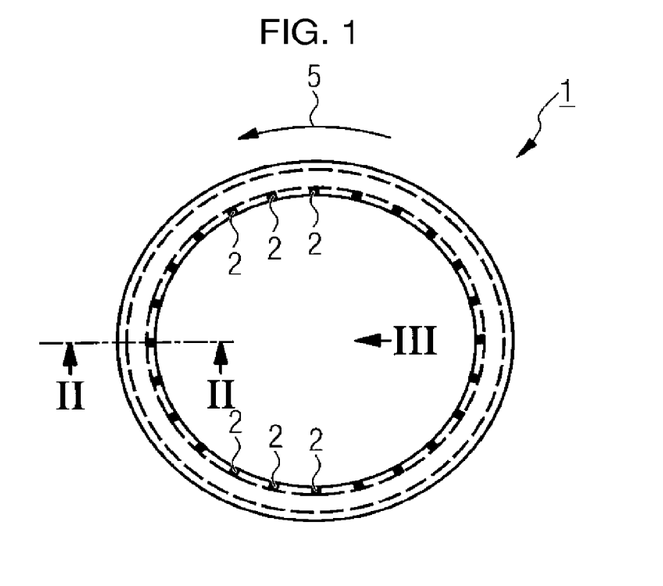
FIG. 1 is a diagrammatic, top view of an O-ring seal with accommodating openings.

Referring now to the figures of the drawing in detail and first, particularly, to FIG. 1 thereof, there is shown a sealing element fastening system for ring-shaped sealing elements 1 of a reactor pressure vessel of a nuclear power station.

Figure 2:
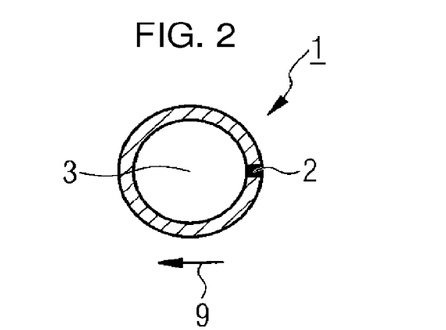
FIG. 2 is a cross-sectional view, taken along the line II-II shown in FIG. 1, of the O-ring seal with an accommodating opening.
Figure 3:
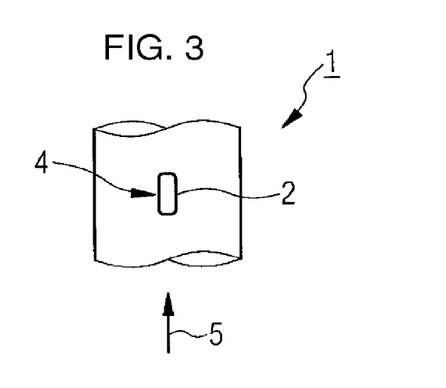
FIG. 3 is an enlarged representation of a top view as shown by arrow III in FIG. 1 of a detail of the O-ring seal.

FIG. 1 shows a top view of an O-ring seal of this type. A plurality of accommodating openings 2 are positioned circumferentially on the inside of the seal as a type of equipartitioning, recesses connecting to the accommodating openings radially outward. A cross section of the O-ring seal represented in FIG. 2 discloses that the sealing element 1 used is a hollow body. Accordingly, each recess also serves as an access channel to a hollow space 3 of the tubular sealing element 1. The base area 4 of such an access channel is shown in FIG. 3. It is realized in the shape of a slot in a circumferential direction 5 of the O-ring seal and can essentially be reduced to a basic rectangular shape, where the two opposite shorter sides have been replaced in each case by an outwardly curved segment.

Figure 16:
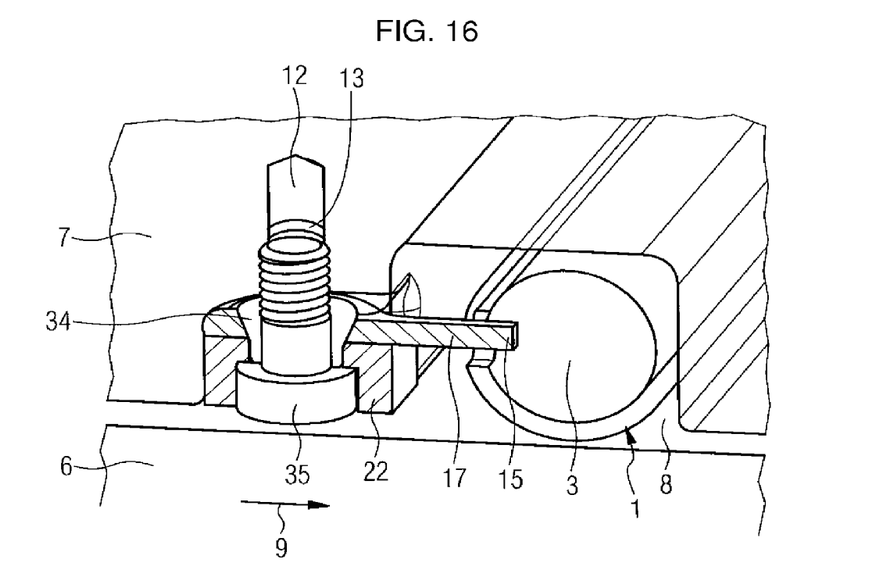
FIG. 16 is a partial perspective view and a partial cross-sectional view of the sealing part centrally through an indentation and through the accommodating groove connected thereto including the alternative unit of the sealing element fastening system according to the invention in the operating state of the pressure vessel.
Figure 17:
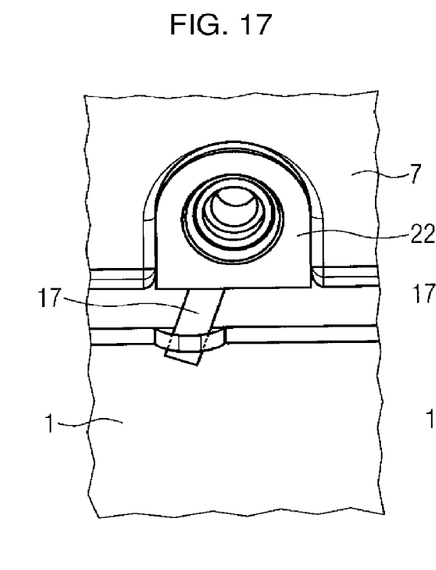
FIG. 17 is a top view of a detail of the underside of the sealing part facing the corresponding opening on the pressure vessel including the pre-assembled alternative unit of the sealing element fastening system according to the invention without the cap screw.
Figure 18:
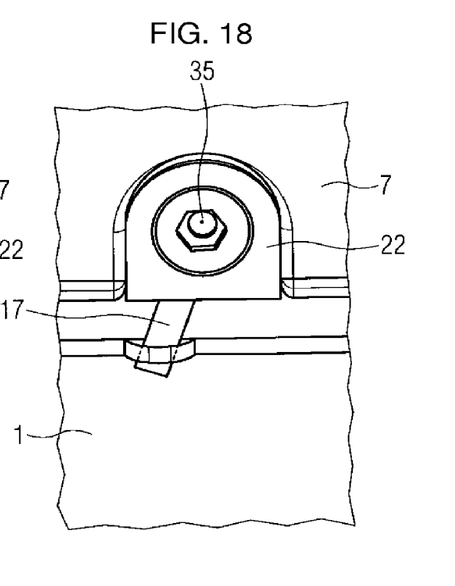
FIG. 18 is a top view of a detail of the underside of the sealing part facing the corresponding opening on the pressure vessel including the alternative unit of the sealing element fastening system according to the invention.

The reactor pressure vessel looked at in this exemplary embodiment can be regarded in a first approximation as having two parts. In this case the first part, designated below as a reactor pressure vessel or simply only as pressure vessel 6, functions as a container that is open at one end. The container can be supplemented by the second part, a sealing part 7, for which the term cover is also used below, to form a serviceable pressure vessel 6 (see FIG. 16).

Figure 4:
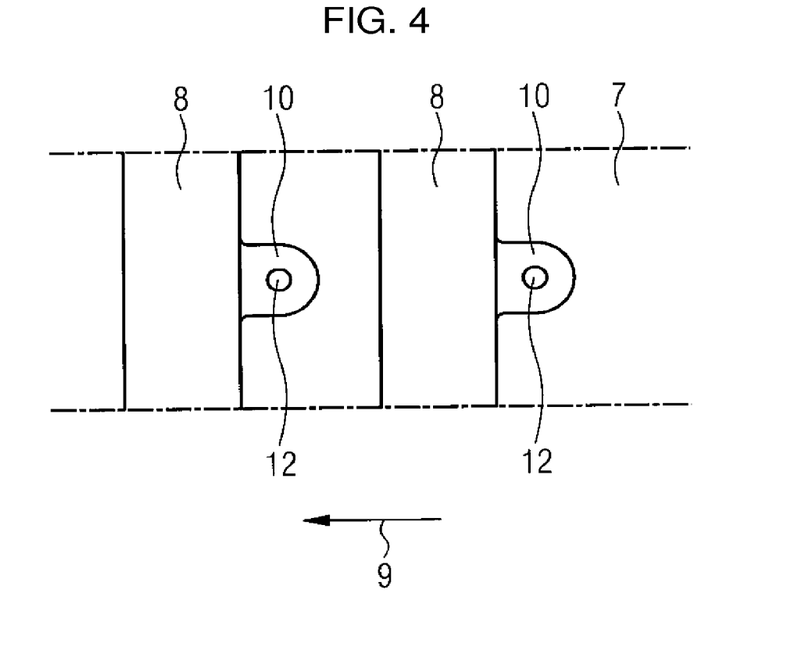
FIG. 4 is a top view of a detail of an underside of a sealing part facing the corresponding opening on a pressure vessel.
Figure 5:
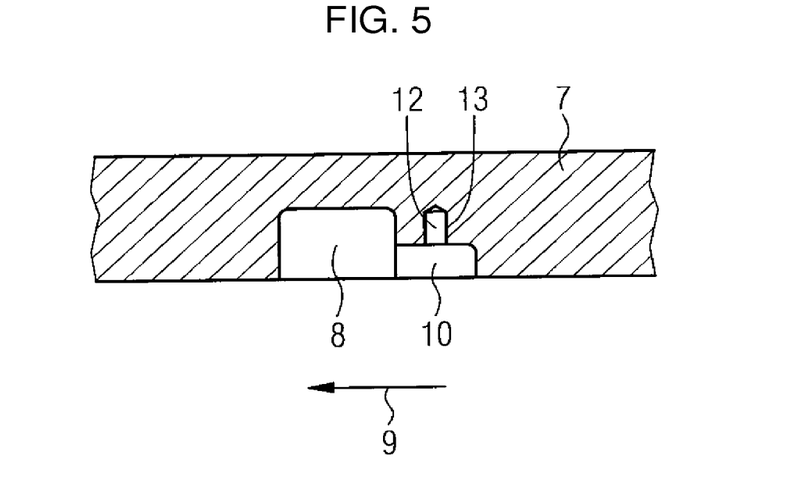
FIG. 5 a cross-sectional view of the sealing part centrally through an indentation and through an accommodating groove that connects thereto.

Two ring-shaped sealing elements 1, which are fastened to the cover of the pressure vessel 6, are provided for the reactor pressure vessel. To this end, the two O-ring seals, in the operating state of the pressure vessel 6, are inserted at least partially in two concentric and equally ring-shaped accommodating grooves 8 in the cover of the pressure vessel 6. A top view of the accommodating grooves 8 is shown in detail in FIG. 4. The concentric arrangement of the two sealing elements 1 creates a double seal-barrier in a radial direction 9. The accommodating groove 8, partially visible on the right-hand side in the figure, is a component of the inner seal and the adjacent left-hand accommodating groove 8 is part of the outer seal. A number of indentations 10 corresponding to the number of accommodating openings 2 are provided on the inside of the respective ring-shaped seal in the sealing part 7 with a U-shaped base surface, into which indentations in each case a unit 11 of the sealing element fastening system can be inserted. A bore 12, placed approximately centrally, connects to the bottom of each indentation 10 in the direction of the cover of the pressure vessel 6. The bore 12 is provided with a counter thread 13 for accommodating a screw or a threaded bolt 14. The profile of each indentation 10, just as the profile of the two accommodating grooves 8, is rectangular. This is illustrated by a cross section of the sealing part 7, represented in FIG. 5, centrally through an indentation 10, selected as an example, and through the accommodating groove 8 connected thereto.

Figure 6:
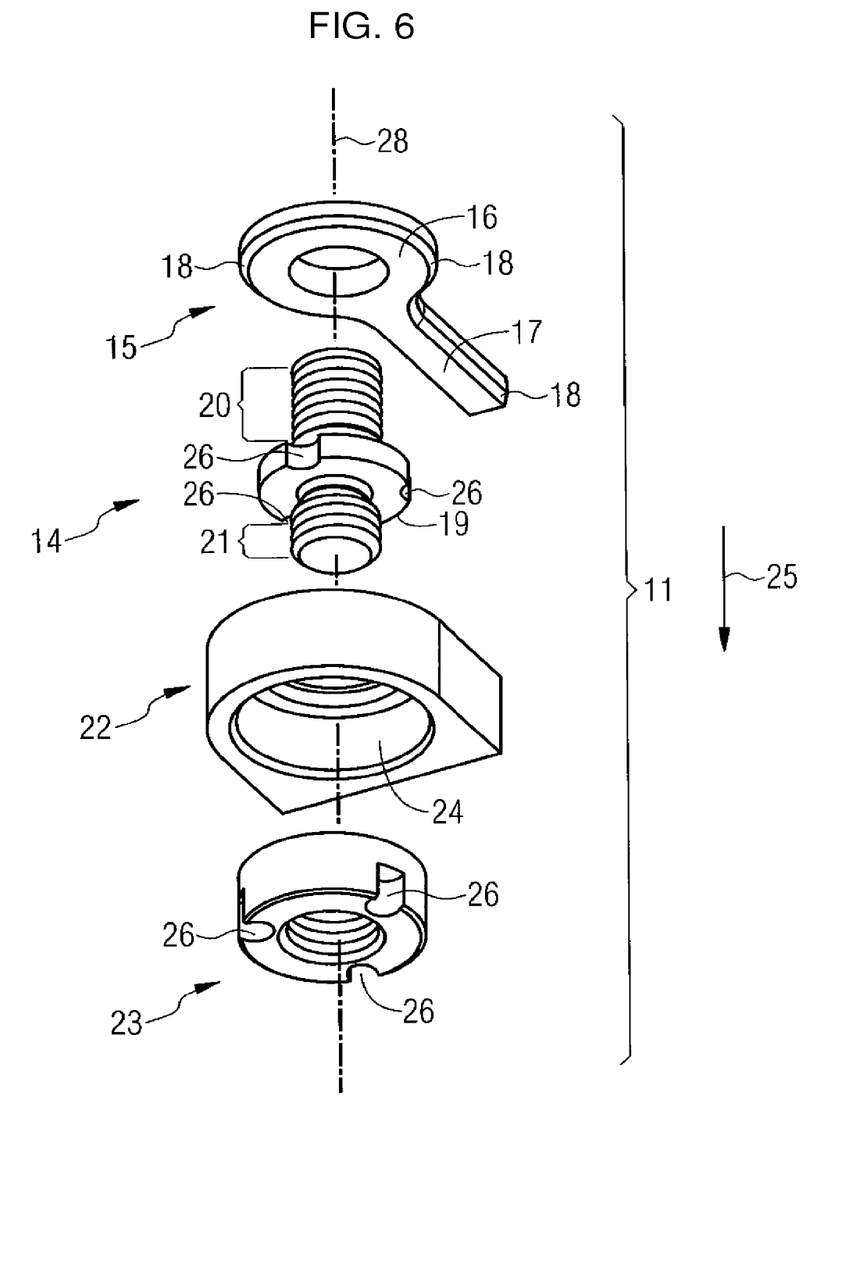
FIG. 6 is an exploded, perspective view of a unit of a sealing element fastening system according to the invention.
Figure 7:
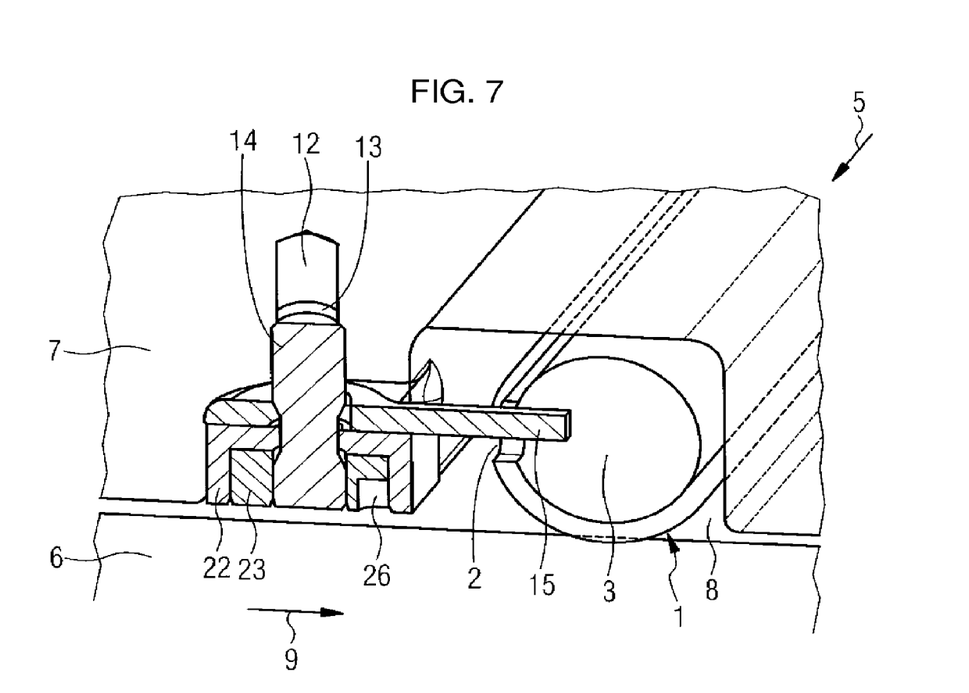
FIG. 7 is a partial perspective view and a partial cross-sectional view of the sealing part centrally through an indentation and through the accommodating groove connecting thereto including the unit of a sealing element fastening system according to the invention in the operating state of the pressure vessel.

FIG. 6 shows a unit 11 of a variant of the sealing element fastening system. A ring-shaped body 16, on which a cuboidal-shaped holding arm 17 is integrally molded, serves as a holding element 15. In the operating state of the pressure container 6, each holding arm 17 engages in a correspondingly positioned access channel on the sealing element 1. The corresponding state is documented in FIG. 7. The ring-shaped periphery of the holding element 15 and the two side faces of the holding arm 17 connected thereto have been provided at the edge with chamfers 18, which are to make an assembly or insertion easier.

On a threaded bolt 14 with two separate threaded portions 20, 21, a thread-free region with a reduced outside diameter is provided between the threaded portions 20, 21, the thread-free region bearing a ring-shaped projection 19 in the center. In the operating state of the pressure vessel 6, the first threaded portion passes through the holding element 15 associated therewith and is screw-connected into a counter thread 13 in the cover of the pressure vessel 6. The top side of the ring-shaped projection 19 facing the first threaded portion 20 serves, in this case, as a stop member for the ring-shaped body 16 of the holding element 15, such that this latter is clamped quasi between the ring-shaped projection 19 and the bottom of the indentation 10 in the sealing part 7.

The underside of the ring-shaped projection 19 facing the second threaded portion 21 functions, in contrast, as a stop member for a fill element 22, which, in its turn, in the operating state of the pressure vessel 6, is clamped between the underside of the ring-shaped projection 19 and a cylindrical bolt nut 23 screw-connected onto the second threaded portion 21.

The fill element 22, which is to seal the corresponding indentation 10 in the operating state of the pressure vessel 6, has a basic shape similar to a U supplementing the indentation 10. A cylindrical opening 24 that is positioned approximately centrally in the fill element 22 is subdivided into three regions which differ with regard to the diameter of the opening and the measurement in the direction of the order of assembly 25. The first opening portion facing the threaded bolt 14 is provided with an inside diameter that is slightly greater than the outside diameter of the ring-shaped projection 19 on the threaded bolt 14. For the second opening portion an inside diameter has been selected that, on the one hand, is smaller than the outside diameter of the ring-shaped projection 19 and of the bolt nut 23 and, on the other hand, is greater than the outside diameter of the threaded bolt 14. The third opening portion finally has an inside diameter that is somewhat greater than the outside diameter of the bolt nut 23. The measurements of the opening portions in the order of assembly 25 are selected such that the ring-shaped projection 19, on the one hand, and the bolt nut 23, on the other hand, in the operating state of the pressure vessel 6, are arranged countersunk in the fill element 22 closed off in a flush manner.

The wording used in this context, such as, for example, "somewhat greater", is to be understood in this description to the effect that no precisely complementary shapes are provided for the components placed opposite each other in each case. Instead of which, the assembling of the components is to be made easier with a little play. In particular in the case of the reactor pressure vessel, the important point is the fit as the assembly of the units 11 can only be performed in protective clothing including appropriate gloves. Accordingly, a deviation in this regard is implemented even for the shapes of fill element 22 and indentation 10 that in principle complement each other.

Three cylinder-like recesses 26, admitted on the periphery of the ring-shaped projection 19 and being a type of equipartitioning, serve as a point of application for a tool 27, by which the threaded bolt 14 is screw-connected into the counter thread 13 in the sealing part 7. On the cylindrical bolt nut 23 associated therewith are also situated three recesses 26, which in form and relative position to each other match those on the ring-shaped projection 19 to such an extent that the identical tool 27 is able to be used for both elements.

Figure 8:
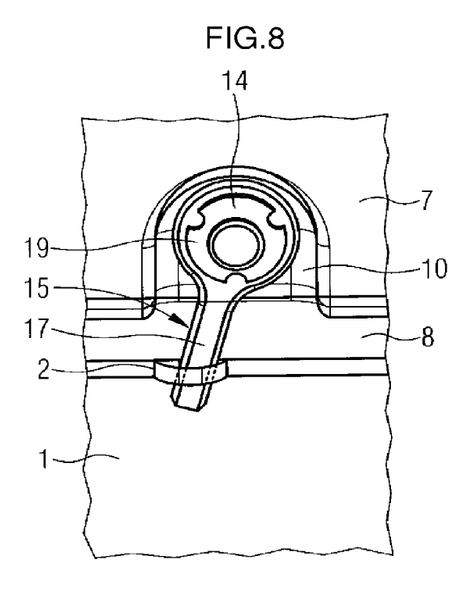
FIG. 8 is a top view of a detail of an underside of the sealing part facing the corresponding opening on the pressure vessel including a holding element and a threaded bolt.
Figure 9:
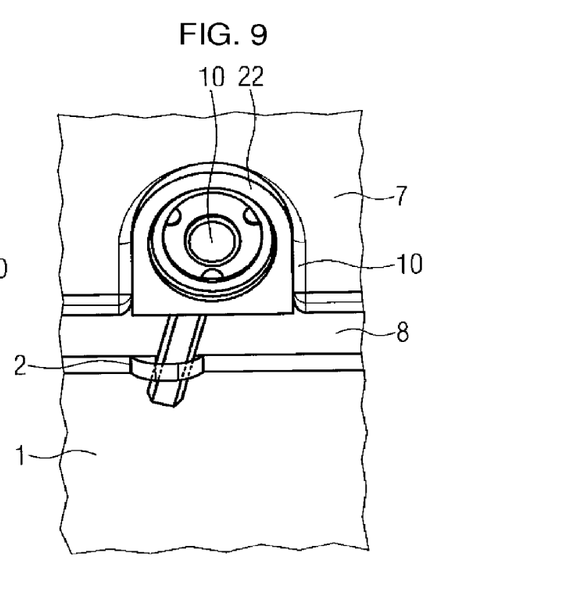
FIG. 9 is a top view of a detail of the underside of the sealing part facing the corresponding opening on the pressure vessel including the holding element, the threaded bolt and a fill element.
Figure 10:
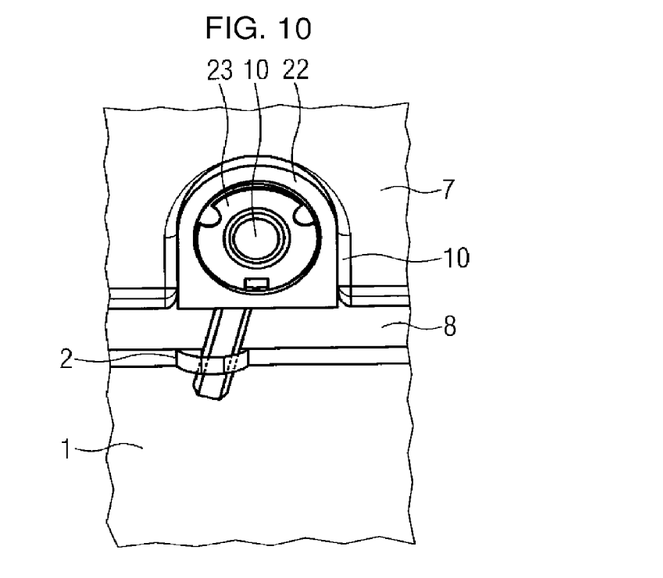
FIG. 10 is a top view of a detail of the underside of the sealing part facing the corresponding opening on the pressure vessel including the unit of the sealing element fastening system according to the invention in the operating state of the pressure vessel.

By using a threaded bolt 14 with a ring-shaped projection 19 in place of a simple screw, it is possible to perform the assembly of the units 11 of the sealing element fastening system, as shown in the diagrams in FIGS. 8 to 10, in two part steps. In the first step, the holding element 15 is positioned in the corresponding indentation 10 and the holding arm 17 is introduced into the access channel. To pre-fix the holding element 15, the first threaded portion 20, passing through the holding element 15, is screw-connected into a counter thread 13 on the cover of the pressure vessel 6 until the holding element 15 is fastened to the cover, but is still able to be rotated about a central longitudinal axis 28 of the threaded bolt 14. The degree of freedom of movement consequently remaining serves for compensating inaccuracies in the production of the access channels and for creating a large tolerance range when inserting the O-ring seal into the accommodating groove 8 provided for this purpose. Once the arm positions of all the holding elements 15 used have been adjusted, the threaded bolt 14 is screwed down. In the second assembly step, the fill element 22 is inverted over the second threaded portion 21 and fixed with the bolt nut 23. The achievement by separating holding element fastening and fill element fastening is that the fill element 22 does not obstruct the view when the holding arm 17 is being aligned.

Figure 11:
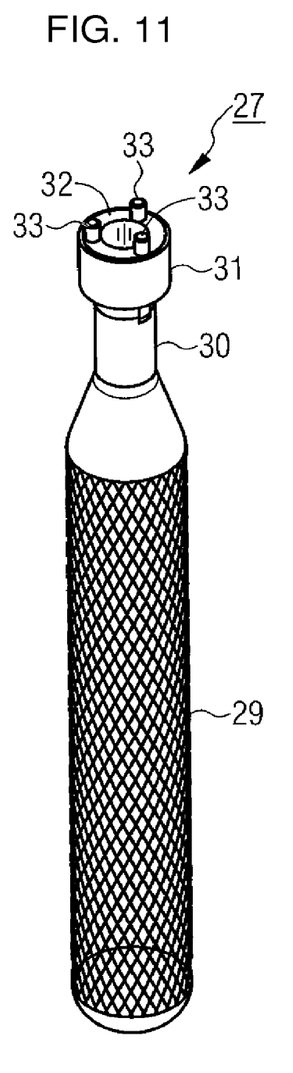
FIG. 11 is a perspective view of a special tool as an assembly aid for the units of a sealing element fastening system according to the invention.
Figure 12:
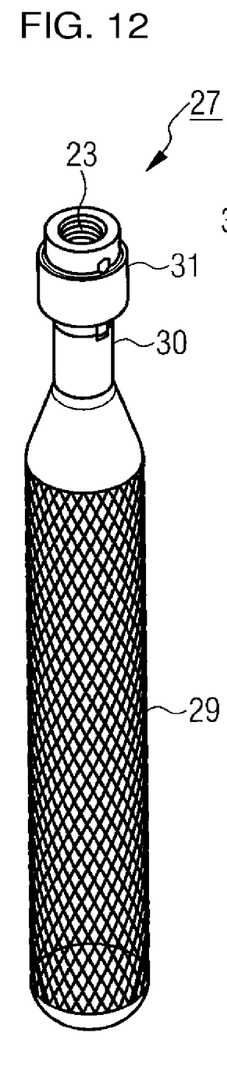
FIG. 12 is a perspective view of a special tool as an assembly aid for the units of the sealing element fastening system according to the invention including a bolt nut placed in position.
Figure 13:
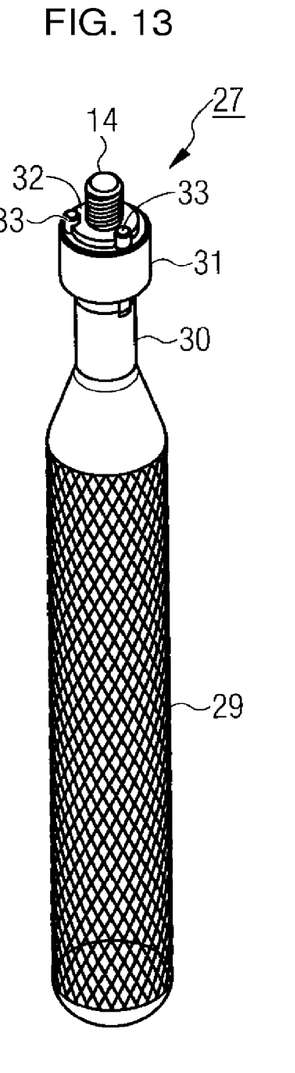
FIG. 13 is a perspective view of the special tool as an assembly aid for the units of the sealing element fastening system according to the invention including a threaded bolt placed in position.

FIGS. 11 to 13 show a tool 27 constructed for a two-stage assembly. In this case this is a rigid body with a tool grip 29, a tool shaft 30 and a tool head 31. Three pin-like grip elements 33, which can engage in the complementary recesses 26 on the bolt nuts 23 or on the threaded bolt projections 19, are integrally molded on the end face 32 of the hollow-cylindrical tool head 31. The pin length, in this case, is matched precisely to the recesses 26 on the bolt nuts 23. The inside diameter of the tool head 31, formed in the manner of a hollow cylinder, is greater than the outside diameter of the threaded bolt 14 and smaller than the outside diameter of the ring-shaped projection 19. This means that the tool head 31 can be inverted so far over the second threaded portion 21 until its pin-like gripping elements 33 engage in the recesses 26 on the ring-shaped projection 19.

Figure 14:
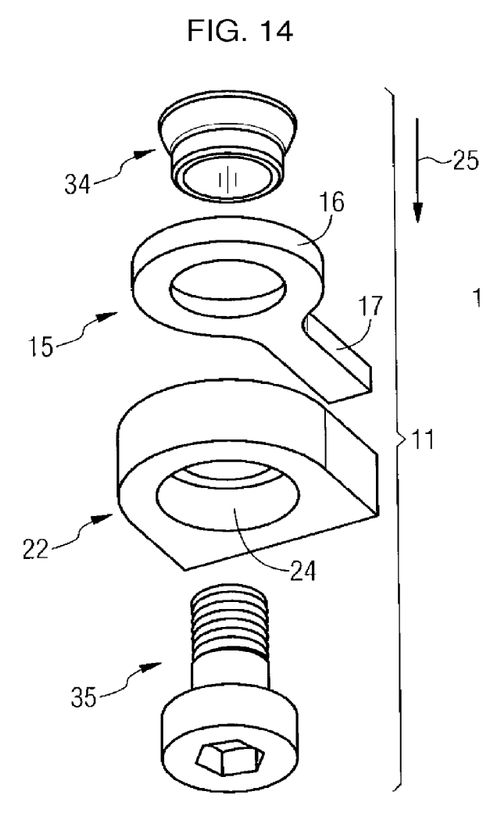
FIG. 14 is an exploded, perspective view of an alternative unit of the sealing element fastening system according to the invention.
Figure 15:
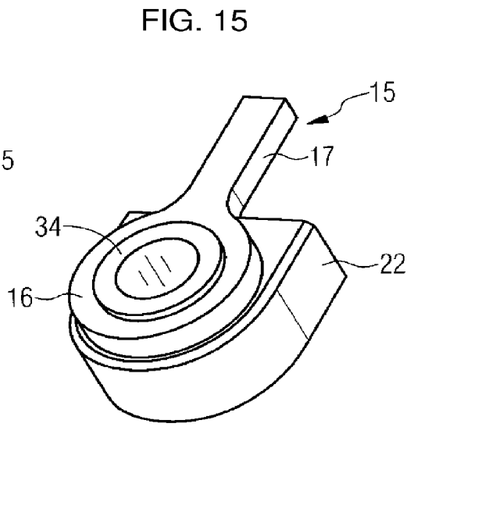
FIG. 15 is a perspective view of the pre-assembled alternative unit of the sealing element fastening system according to the invention without a cap screw.

A unit 11 of the sealing element fastening system of an alternative variant can be seen in FIG. 14. The holding element 15 is also ring-shaped in this version and has a cuboidal integral molding as holding arm 17. However, contrary to the previous version, the edge-face edges are not chamfered. In a pre-assembly, the holding element 15 is fastened so as to be rotatable on the fill element 22 by a clamping bush 34, which is pressable into a central opening on the fill element 22 by way of the opening 24 that connects thereto. The rotatability of the holding arms 17 makes it possible, even in the case of the alternative variant of the sealing element fastening system, to undertake adaptations with regard to the relative position of the access channels. It is accepted here that during the final assembly vision is at least partially restricted by the fill element 22. On the other hand, the ability to pre-assemble the individual components of a unit 11 of the sealing element fastening system device that the time spent at the final assembly is reduced. This is of great importance, above all in the case of reactor pressure vessels, as the time a fitter is allowed to remain in the near range of the pressure vessel 6 has to be restricted on account of increased radioactive radiation. Within the pre-assembly process, the hollow-cylindrical part of the clamping bush 34, passing through the holding element 15, is pushed into the opening 24 in the fill element 22. To realize a frictional connection, the outside diameter of the cylindrical part of the clamping bush 34 is slightly greater than the inside diameter of the equally cylindrical opening 24 on the fill element 22. As the outside diameter of the cylindrical part of the clamping bush 34 is smaller than the inside diameter of the ring-shaped holding element 15 and as a conical part with an increasing outside diameter connects to the cylindrical part of the clamping bush 34, it is ensured, on the one hand, that the holding element 15 is fastened to the fill element 22 and, on the other hand, that the holding arm 17 is rotatably mounted. In the final assembly, the pre-assembled unit 11 shown in FIG. 15 is inserted into the indentation 10 in the sealing part 7 and fastened to the cover of the pressure vessel 6 by way of a cap screw 35 that passes through the pre-assembled unit. In the operating state of the pressure vessel 6, the cap 35 or fastening screw is then screw-connected far enough into the counter thread 13 in the sealing part 7 so that the head of the screw is positioned countersunk in the fill element 22.

The invention claimed is:

1. A sealing element fastening system for at least one sealing element for a pressure vessel having at least one opening, the sealing element fastening system comprising:
    a sealing part being a cover for the at least one opening, said sealing part having an accommodating groove formed therein for said at least one sealing element, wherein,
    in an operating state of the pressure vessel, said at least one sealing element is at least partially inserted in said accommodating groove;
    said sealing part having indentations formed therein, said indentations each having a respective sealing element fastening device disposed therein; and said indentations each being sealed by a respective fill element in the operating state of the pressure vessel, said fill element occupying a majority of a space within said indentation, and said fill element being in sealing engagement against a surface of the pressure vessel for blocking a potential flow of fluid into said indentation.

2. The system according to claim 1, wherein each said respective sealing element fastening device has a ring-shaped holding element with an integrally molded holding arm, and is fixed to said sealing part in the operating state of the pressure vessel.

3. The system according to claim 2, wherein in the operating state of the pressure vessel, said integrally molded holding arm engages into a recess on said at least one sealing element and fixes said at least one sealing element on said sealing part.

4. The system according to claim 3, wherein:
    said sealing part has a respective complementary counter thread at each of said indentations; and
    each said respective sealing element fastening device has a bolt nut and a threaded bolt with two separate threaded portions including a first threaded portion and a second threaded portion, said first threaded portion passes through said ring-shaped holding element in the operating state of the pressure vessel and is screw-connected into said respective counter thread, said second threaded portion passes through said fill element in the operating state of the pressure vessel and accommodates said bolt nut as a fixing device for said fill element.

5. The system according to claim 4, wherein each said respective sealing element fastening device has a ring-shaped projection disposed between said first and second threaded portions and functioning as a stop member for said fill element and for said holding element.

6. The system according to claim 5, wherein said ring-shaped projection has a number of recesses formed therein functioning as a point of application for a tool.

7. The system according to claim 6, wherein said bolt nut has a number of further recesses formed therein, which in form and relative position to each other are identical to said recesses on said ring-shaped projection, said further recesses function as a point of application for the tool.

8. The system according to claim 3,
    wherein said fill element has a respective central opening formed therein; and
    a clamping bush is provided through each said holding element and is pressed into said central opening in said fill element for a rotational fixing of said holding element on said fill element.

9. The system according to claim 8, further comprising a fastening screw penetrating said fill element, said holding element and said clamping bush, in the operating state of the pressure vessel, said fastening screw being screw-connected into a complementary counter thread formed in said sealing part.

10. The system according to claim 1, wherein said sealing part is a cover.

11. A pressure vessel, comprising:
   at least one sealing element;
   a sealing element fastening system for said at least one sealing element, said sealing element fastening system including;
   a sealing part being a cover for an opening in a pressure vessel, said sealing part having an accommodating groove formed therein for said at least one sealing element, wherein,
   in an operating state of the pressure vessel, said at least one sealing element is at least partially inserted in said accommodating groove;
   said sealing part having indentations formed therein, said indentations each having a respective sealing element fastening device disposed therein; and
   said indentations each being sealed by a respective fill element in the operating state of the pressure vessel, said fill element occupying a majority of a space within said indentation, and said fill element being in sealing engagement against a surface of the pressure vessel for blocking a potential flow of fluid into said indentation.

12. The pressure vessel according to claim 11, wherein the pressure vessel is a reactor pressure vessel.

* * * * *